United States Patent
Sasse et al.

[11] Patent Number: 6,068,302
[45] Date of Patent: May 30, 2000

[54] JOINING CONNECTION OF AN EXHAUST-GAS-CARRYING PIPE HAVING A FASTENING FLANGE AND PROCESS FOR MANUFACTURING SAME

[75] Inventors: Michael Sasse, Hamburg; Jürgen Schmidt, Ahlerstedt, both of Germany

[73] Assignee: DaimlerChrysler AG, Stuttgart, Germany

[21] Appl. No.: 08/974,759

[22] Filed: Nov. 20, 1997

[30] Foreign Application Priority Data

Nov. 20, 1996 [DE] Germany .................. 196 47 961

[51] Int. Cl.[7] ................................................ F16L 13/02
[52] U.S. Cl. ........................................ 285/288.1; 228/164
[58] Field of Search ........................... 285/22, 141.1, 285/288.1, 288.5, 405, 416, 163 FOR, 167 FOR; 228/164, 173.4

[56] References Cited

U.S. PATENT DOCUMENTS

| | | | |
|---|---|---|---|
| 972,119 | 10/1910 | McKibben | 285/288.1 X |
| 2,209,325 | 7/1940 | Dennis | 285/288.1 X |
| 2,567,639 | 9/1951 | Fulton | 285/22 |
| 3,055,097 | 9/1962 | Douglas | 285/22 X |
| 3,769,489 | 10/1973 | Charlesworth | 285/288.1 X |
| 4,712,720 | 12/1987 | Tesch | 228/49.3 |
| 4,832,383 | 5/1989 | Roussel | 285/416 |
| 4,930,817 | 6/1990 | Fuchs | 285/288.1 X |

FOREIGN PATENT DOCUMENTS

| | | |
|---|---|---|
| 1 418 052 | 11/1965 | France . |
| 10 18 681 | 10/1957 | Germany . |
| 30 05 882 | 9/1981 | Germany . |
| 88 16 369 | 7/1989 | Germany . |
| 39 15 346 | 11/1989 | Germany . |
| 57-15923 | 1/1982 | Japan ................... 285/FOR 163 |
| 239 430 | 10/1945 | Switzerland . |
| 14404 | of 1907 | United Kingdom ............. 285/22 |

*Primary Examiner*—Terry Lee Melius
*Assistant Examiner*—Greg Binda
*Attorney, Agent, or Firm*—Evenson McKeown Edwards & Lenahan, P.L.L.C.

[57] ABSTRACT

The invention relates to a joining connection of at least one exhaust-gas-carrying pipe of an internal-combustion engine having a fastening flange which is inserted in its duct and, on its opening edge situated inside the duct, is welded to the duct wall of the flange, and to a process for its manufacture. In order to provide in a simple manner an automating capacity of the manufacture of the joining connection which is reliable with respect to the process, at least one support projection is constructed in an axially position-defined manner on the duct wall. The support projection projects into the duct and the pipe rests directly on the support projection in the plug-in position in the axial direction. The interior wall of the pipe ends flush with the end edge or projects radially beyond it toward the inside.

14 Claims, 2 Drawing Sheets

JOINING CONNECTION OF AN EXHAUST-GAS-CARRYING PIPE HAVING A FASTENING FLANGE AND PROCESS FOR MANUFACTURING SAME

BACKGROUND AND SUMMARY OF THE INVENTION

This application claims the priority of German application 196 47 961.4, the disclosure of which is expressly incorporated by reference herein.

The invention relates to a joining connection of an exhaust- gas-carrying pipe having a fastening flange and to a process for its manufacture.

A joining connection of this general type and a manufacturing process of this general type are known from German Patent Document DE 39 15 346 A1. For relieving the weld seam in the case of the connection described there, on the one hand, the pipe end to be inserted is expanded and then tapered, the pipe end assuming a wedge shape. On the other hand, a corresponding shape-equivalent sunk portion is created on the fastening flange so that, on the one hand, the pipe can be inserted in a simple manner into the flange by centering and, on the other hand, a press fit of the pipe in the flange can be achieved during the further insertion because of the wedge effect resulting from the shape of the pipe end. The described construction of the plug-in partners (flange—pipe) requires considerable manufacturing expenditures and is therefore very cost intensive. Furthermore, in the case of the known joining connection, an automation of the manufacture, which contains, for example, a welding robot, is virtually impossible because of the manufacturing tolerances of the pipe having an effect in the axial direction. In the case of each part to be joined, the welding robot always welds at the same point within the flange. If, in the plug-in position of the pipe, the pipe end is positioned deeper than desired in the flange, the robot will weld onto the interior side of the flange, whereby no weld joint is created between the pipe and the flange.

If the pipe end is positioned higher than desired in the flange, the robot will weld onto the flange which also does not result in a weld joint of the plug-in partners. Between these extreme relative positions, many axial positions of the pipe end with respect to the flange are possible which, however, permit only very unsatisfactory, that is, qualitatively poor weld joints. Because of the many possible position deviations, a welded connection in the optimal position does not occur frequently so that, in the case of an automated manufacturing, a high reject rate must be expected. This increases the costs of an automation since the costs of the quality control of the joint after its manufacturing reach significant figures.

It is an object of the invention to further develop a joining connection of the above-mentioned type or a process of the above-mentioned type for its manufacture in that an automation capability of the manufacture of the joining connection can be made possible which is simple and safe with respect to the process.

According to the invention, this object has been achieved by joining connection of at least one exhaust-gas-carrying pipe of an internal-combustion engine having a fastening flange which is inserted in its duct and, on its opening edge situated inside the duct, is welded to the duct wall of the flange, characterized in that, on the duct wall, at least one support projection which projects radially inward into the duct is constructed in an axially position-defined manner with a plane support surface on which the pipe rests directly in the axial direction in the plug-in position, the interior wall of the pipe closing off flush with the end edge of the projection or projecting radially beyond it toward the inside.

According to the invention, this object has been achieved by process for manufacturing a joining connection according to claim 1, after the production of the flange and its duct, an exhaust-gas-carrying pipe being fitted in a positioning manner in the duct, and, on its opening edge situated in the duct, being welded to the duct wall, characterized in that, before the insertion of the pipe in the flange, inside the duct on the duct wall, at least one support projection, which projects into the duct in a radially inward manner, is produced in an axially position-defined fashion with a plane support surface, after which the pipe is inserted into the flange until its opening edge comes to rest on the support projection, during the production, the projection being constructed such that the inside wall of the pipe closes off flush with its interior end edge or projects beyond it toward the inside.

As the result of the invention, the support projection provides a stop for the exhaust gas pipe to be inserted which has an axially defined position. In mass production, all exhaust gas pipes therefore have the same position in the flange assigned to them independently of axial manufacturing tolerances. Because of the identical position, the welding robot, which is programmed with respect to a specific point in the flange, specifically the area of the contact of the pipe on the supporting projection, can generate a weld joint of high durability which is the same for all assembly components. Because of the identical position, the robot will always weld at the position which is correct for an optimal weld joint. The support projection can be mounted on the flange in a simple manner so that, on the whole, the manufacture of the desired joining connection can take place at very low expenditures. Special developments of the flange and the pipe, which, in addition, must even be adapted to one another, are eliminated. For obtaining a qualitatively satisfactory weld seam and thus a sufficient welded connection, it is absolutely necessary that, in the plug-in position of the two plug-in partners pipe and flange, the interior pipe side slightly projects beyond the end edge of the support projection toward the interior but at least closes off flush with it. As a result, the welding robot definitely reaches without any difficulty the point of the transition between the opening edge and the end edge of the support projection and can provide the weld seam (fillet weld) there. Because of the generating of a high-quality joining connection which is always successful during the manufacture, rejects of assembly components joined in a low-quality manner are prevented. This ensures the reliability of the process in the case of an automation of the manufacture of a joining connection.

Other objects, advantages and novel features of the present invention will become apparent from the following detailed description of the invention when considered in conjunction with the accompanying drawings.

DETAILED DESCRIPTION OF THE DRAWINGS

Figure 1:
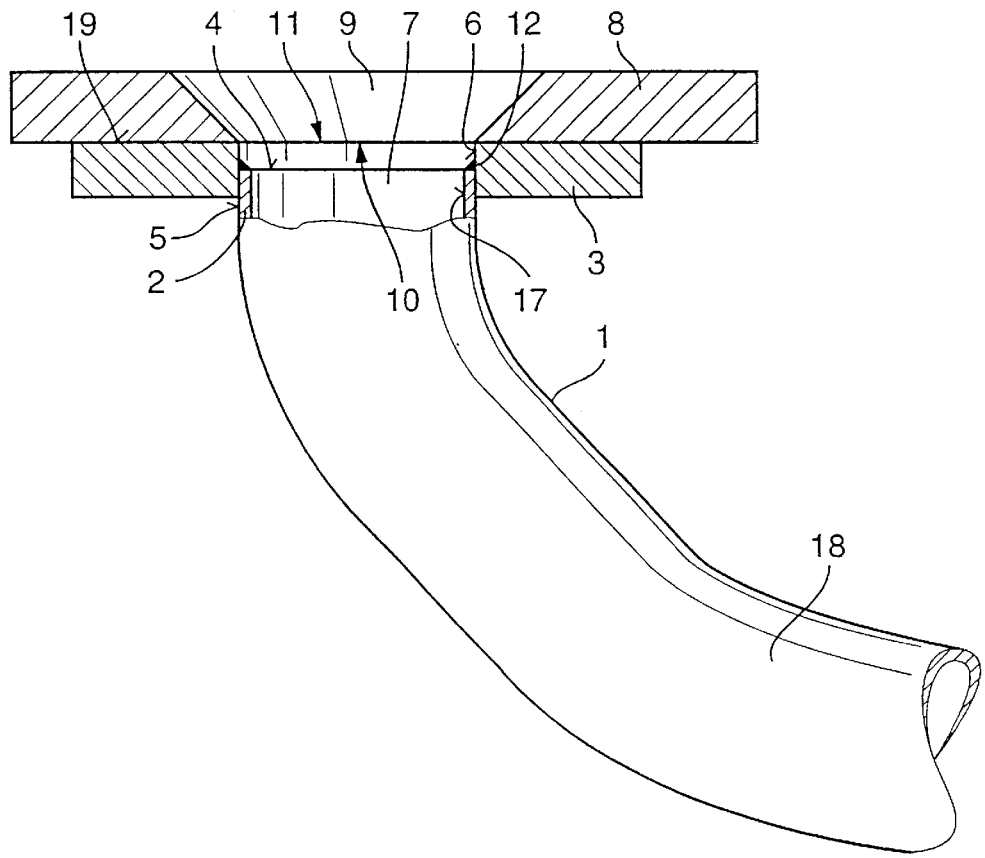
FIG. 1 is a lateral longitudinal sectional view of the joining connection according to the invention on a cylinder head section.

FIG. 1 illustrates a section of an exhaust gas pipe 1 constructed as a quadrant pipe which by means of one end 2 is mounted on a flat fastening flange 3. The pipe end 2 has its opening edge 4 within the flange 3 and, by means of its exterior side 5, rests with its circumference essentially completely against a smoothly cylindrical wall 6 of a duct 7 arranged in the flange 3. The flange 3 and the exhaust gas pipe 1 form an assembly component which is fastened on a cylinder head 8 of an internal-combustion engine, for example, by means of a screwed connection or a welded connection. In this case, the assembly component and the cylinder head 8 are arranged with respect to one another such that an exhaust gas outlet 9 of the cylinder head 8, by means of its outlet opening 10, directly adjoins an inlet opening 11 of the duct 7 of the flange 3, the edges of the openings 10, 11 being aligned with one another. The exhaust gas pipe 1 is welded directly to the opening edge 4 of its pipe end 2 with the flange 3 while forming a surrounding fillet weld 12. The exhaust gas pipe 1 may replace several individual exhaust gas pipes which, by means of their pipe ends, are arranged in the respective duct of individual fastening flanges and are fixedly connected with them. Likewise, it is possible to arrange several individual exhaust gas pipes in ducts of a common flat or plane fastening flange and to directly fasten them to it by means of their pipe ends.

For the use of the assembly component, it is also conceivable to provide this assembly component on the inlet side of the cylinder head 8, in which case the exhaust gas pipe 1 forms an intake pipe of the fresh-air intake of the internal-combustion engine. The assembly component, which in comparison to the exhaust gas side of the cylinder head 8 is acted upon by low temperatures, may also be glued to the cylinder head 8.

The flange 3 may be a cast part, a sintered or forged component or—which in the case of plane, flat flanges, with respect to manufacturing, results in the lowest expenditures and in the lowest cost—a stamping, particularly a precision-blanked part. During the stamping-out of the flange contours, the ducts 7 are simultaneously also stamped or precision-blanked. For manufacturing the joining connection between the exhaust gas pipe 1 and the flange 3, after the manufacturing of the flange by means of a stamp 13, wall material is subjected to a targeted, scraping along the duct wall 6 in the axial direction to a previously determined depth within the flange 3. The scraped-off wall material will then project as a thin scraping chip projection into the clear cross-section of the duct 7 and in the process forms a support projection 14 for the exhaust gas pipe 1. The manufacturing of the support projection 14 may take place in a work station which is separate from the actual production line in parallel to the normal assembling and manufacturing steps so that there is no high-cost extension of the cycle time.

Figure 2:
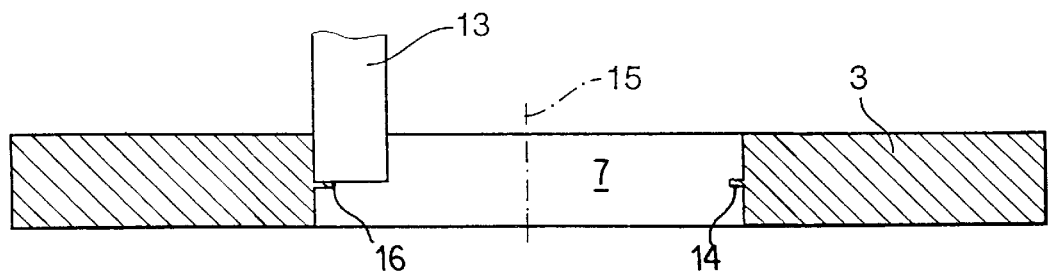
FIG. 2 is a lateral longitudinal sectional view of the joining connection according to the invention in the case of the manufacture of a support projection.

The stamp 13 may be separate from the blanking punch—as illustrated in the embodiment of FIG. 2—or may be the blanking punch itself, in the latter case, the blanking punch, for example, for the construction of the support projection 14 having at least one radially movable scraping nose which is moved out in a lowering of the blanking punch which is separate from the preceding punching operation. As an alternative, a punch is conceivable which is combined of two stamps, the stamps being arranged concentrically with respect to one another and being guided to be displaceable on one another. The interior stamp has the function of a blanking punch which is the first to act upon the flange 3 for manufacturing the duct 7. After the retraction of the blanking punch, while the axial position is maintained, the exterior stamp having the scraping function is lowered onto the flange 3, whereby the support projection 14 is generated. In the case of the functional integration of the punching and the forming of the support projection 14 into one punch, a separate working station and the costs for this working station are eliminated. However, in order to stay within the cycle time of the production sequence, the successive steps of the punching of the flange contour and duct(s) 7 and the subsequent construction of the support projection 14 are to be carried out within the same time as in the case of a working station which is separate for forming the support projection 14.

The above-defined axial position of the support projection 14 depends directly on the axial and the radial penetration depth of the punch 13 in the duct wall 6 which must be correspondingly adapted to one another in order to obtain the desired axial position of the projection 14. After the production of the support projection 14, the exhaust gas pipe 1 is inserted into the duct 7 of the flange 3 until the opening edge 4 of the pipe end 2 of the exhaust gas pipe 1 pointing in the plug-in direction rests against the support projection 14. The exhaust gas pipe 1 now has a defined axial position relative to the flange 3, which actual position, because the projection 14 is always situated at the same point, is identical for all plug-in connections, that is, assembly components.

Figure 3:
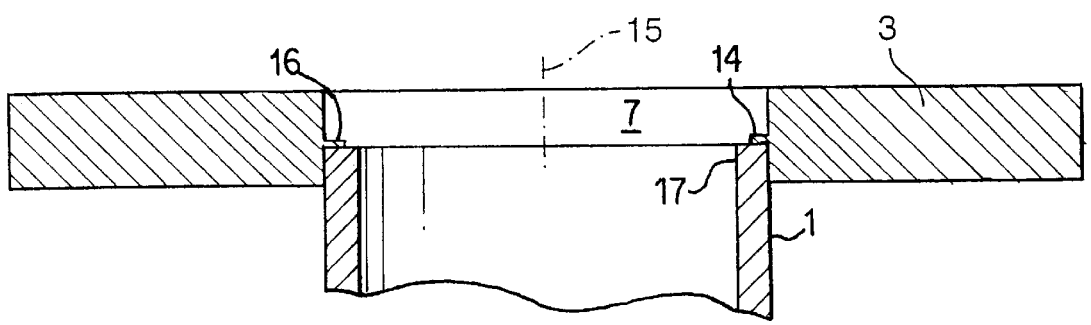
FIG. 3 is a view of the flange shown in FIG. 2 but with the interior wall of the exhaust gas pipe (dotted line) projecting beyond an end edge of the support projection.

The support projection 14 is constructed such that its end edge 16 pointing radially to the axis 15 of the duct 7 ends no more than flush with the interior wall 17 of the exhaust gas pipe 1. As a rule, as illustrated in FIG. 3, interior wall 17 projects considerably beyond the end edge 16. In principle, it is sufficient to provide a single nose-shaped support projection 14 on the wall 6 of the duct 7 of the flange 3. However, the position of the pipe end 2 in the duct 7 will be more stable with respect to tilting if at least—as shown—two support projections 14 are constructed which are situated diametrically opposite to one another. Even more favorable with respect to the tilting stability of the pipe end 2 than two support projections 14 is the arrangement of three projections 14 which are constructed to be offset with respect to one another by 120° respectively in the circumferential direction of the duct wall 6. A surrounding support projection is also conceivable; however, this is unfavorable in the case of a flat stamping as flange 3 because this flange 3 deforms by the all-side action upon the wall 6 in the case of the construction of such a surrounding projection 14 so that the further constructional use of the assembly component is made significantly more difficult.

As an alternative to the scraping production of the support projection 14, this projection 14 can also be constructed by the targeted upsetting of the wall material of the duct wall 6 directed toward the projection 14 to be produced directly above the point intended for the projection 14. Furthermore, it is conceivable to mold the support projection 14 in the form of a nap to the duct wall 6, for example, by means of the injection molding technique by integral casting. When castings, sintered and forged parts are used as the flange 3, it is useful, although connected with considerable machining expenditures, to mill the support projection 14 out of the duct wall 6. Likewise, it is practical with respect to an economical process when producing the flange 3 in the form of a casting to simultaneously also cast the support projection 14. Furthermore, it is conceivable to glue the support projection 14 as a separate component to the duct wall 6.

After the insertion of the exhaust gas pipe 1 into the fastening flange 3, the exhaust gas pipe 1 is clamped in the contact position on the support projection 14 and the flange 3 is clamped in. Relative to the fastening flange 3, the clamping-in takes place in the axial direction, for example, by means of a hand-operated tension jack or by means of a toggle-type tension jack, in which case the exhaust gas pipe 1 is held on a pipe section 18 which is situated essentially in parallel to the flange 3 and is pressed against the support projection 14. The abutment of the clamping is situated on the side 19 of the fastening flange 3 facing away from the exhaust gas pipe 1. In the clamped-in condition, the assembly component is swivelled on a turntable to the machining station of a welding robot. Because of the axial clamping-in and the firm contact of the plug-in partners on one another, no changes of the relative position with respect to one another take place because of the centrifugal forces occurring during the swivelling.

In a preprogrammed manner, the welding robot moves against the joining point in the area of the contact of the opening edge 4 of the pipe end 2 on the support projection 14 and welds, for example, by means of arc welding, laser welding or electron beam welding a surrounding fillet weld 12. In the process, it is welded on such that a durable stressable connection is achieved between the exhaust gas pipe 1 and the fastening flange 3. Naturally, it is also conceivable that the exhaust gas pipe 1 is only welded to the support projection 14. However, this may be disadvantageous depending on the production of the projection 14 with respect to the durability of the fillet weld 12 as the result of a possible insufficient fusion penetration. In order to achieve a high quality of the weld 12, it is particularly advantageous to dissolve the support projection 14 during the weld-on operation of the pipe 1 in the forming molten bath, whereby the exhaust gas pipe 1 is welded quasi-directly to the duct wall 6.

On the whole, the joining connection can be used in all applications in the case of which pipes are mounted on flanges after they were inserted in their duct, particularly in the case of exhaust gas elbows, in the case of which are secure clamping-in for establishing the weld joint is very difficult to carry out without changing the mutually positioned plug-in partners in their relative position because of the relatively strongly bent pipes. It should be explicitly noted here again that the important advantage of the manufacturing process according to the invention is the high reproducing capacity of the joining connection and the quasi-non-existent reject rate of the assembly component.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A joining connection for at least one exhaust gas carrying pipe of an internal-combustion engine, comprising a fastening flange including a duct in which an opening edge of the pipe is situated inside the duct and is welded to a duct wall of the flange, at least one support projection formed on the duct wall which projects radially inward into the duct, the support projection being arranged intermediate end faces of the fastening flange and having a plane support surface on which the pipe rests directly in the axial direction in a plug-in position, an interior wall of the pipe closing off flush with an end edge of the projection or projecting inwardly and radially beyond the projection.

2. A joining connection according to claim 1, wherein two projections are formed on the duct wall which are situated diametrically opposite one another.

3. A joining according to claim 1, the supporting projection is a chip formed on the duct wall by a scraping.

4. A joining connection according to claim 1, wherein the support projection is constructed in a nap-type manner.

5. A process for manufacturing a joining connection according to claim 1, wherein after production of the flange and duct, an exhaust gas carrying pipe is fitted in a positioning manner in the duct, an opening edge of the pipe being situated in the duct and being welded to a duct wall, wherein before fitting the pipe in the flange, inside the duct on the duct wall, at least one support projection, which projects into the duct in a radially inward manner, is produced in an axially position-defined fashion with a plane support surface, after which the pipe is inserted into the flange until the opening edge comes to rest on the support projection during the production, the projection being constructed such that an inside wall of the pipe closes off flush with or projects inwardly beyond an interior end edge of the projection.

6. A process according to claim 5, wherein the pipe is clamped in for welding the pipe to the flange.

7. A process according to claim 5, wherein the support projection is molded to the duck wall.

8. A process according to claim 5, wherein the support projection is produced by upsetting the duct wall at a predetermined point.

9. A process according to claim 5, wherein the support projection is produced in the form of a scraping chip by a targeted, scraping of the duct wall taking place in the axial direction.

10. A process according to claim 5, wherein the support projection is milled out of the duct wall.

11. A process according to claim 5, wherein during manufacture of the flange as a casting, the support projection is cast simultaneously.

12. A process according to claim 5, wherein after the insertion, the opening edge of the pipe is welded to the support projection.

13. A process according to claim 5, wherein during a welding step of the pipe onto the duct wall, the support projection is welded to the pipe.

14. A process according to claim 5, wherein during the welding step of the pipe, the support projection is dissolved in a forming molten bath.

* * * * *